United States Patent
Mauro et al.

(10) Patent No.: US 6,279,559 B1
(45) Date of Patent: Aug. 28, 2001

(54) CONTROL METHOD FOR CONTROLLING INJECTION OF AN INTERNAL COMBUSTION ENGINE AS A FUNCTION OF FUEL QUALITY

(75) Inventors: Marco Mauro, San Remo; Stefano Ciuti, Riva Presso Chieri; Enrico Fornatto, Piossasco; Alessandro Volpin, La Loggia; Claudio Zanet, Torino, all of (IT)

(73) Assignee: C.R.F. Soiteà Consortile per Azioni, Orbassano (IT)

( * ) Notice: Subject to any disclaimer, the term of this patent is extended or adjusted under 35 U.S.C. 154(b) by 0 days.

(21) Appl. No.: 09/428,519

(22) Filed: Oct. 28, 1999

(30) Foreign Application Priority Data

Oct. 28, 1998 (IT) .............................. TO98A0913

(51) Int. Cl.⁷ ...................................... F02M 7/00
(52) U.S. Cl. ........................................... 123/672; 123/480
(58) Field of Search ................... 123/672, 480, 123/478, 674

(56) References Cited

U.S. PATENT DOCUMENTS

| | | | |
|---|---|---|---|
| 4,738,238 | 4/1988 | Ohishi | 123/486 |
| 5,094,208 | 3/1992 | Adam et al. | 123/406 |
| 5,121,732 * | 6/1992 | Benninger et al. | 123/672 |
| 5,158,062 * | 10/1992 | Chen | 123/674 |
| 5,197,451 | 3/1993 | Yoshida et al. | 123/696 |
| 5,467,755 | 11/1995 | Konrad et al. | 123/674 |
| 5,775,298 * | 7/1998 | Haller | 123/406.27 |

FOREIGN PATENT DOCUMENTS 3-233151  10/1991 (JP) .

* cited by examiner

Primary Examiner—Tony M. Argenbright
Assistant Examiner—Hien T. Vo
(74) Attorney, Agent, or Firm—Evenson, McKeown, Edwards & Lenahan, P.L.L.C.

(57) ABSTRACT

A control method for controlling injection of an engine having an oxygen concentration sensor generating a composition signal as a function of the oxygen difference in the exhaust gases with respect to the stoichiometric condition of the burnt air/fuel mixture, and a number of injectors for injecting fuel for an operating injection time in each operating state of the engine, and each of which is assigned, in each operating state of the engine, a respective calibration injection time determined at an initial engine calibration stage using a reference fuel. In a given operating state of the engine, the control method including the steps of: determining an intermediate injection time as a function of a number of operating injection times of the injectors; calculating a current correction coefficient as a function of the intermediate injection time and of a reference injection time determined at the initial engine calibration stage using the reference fuel; and determining an operating injection time as a function of the calibration injection time relative to the operating state of the engine, of a closed-loop injection time depending on the composition signal, and of the current correction coefficient.

24 Claims, 2 Drawing Sheets

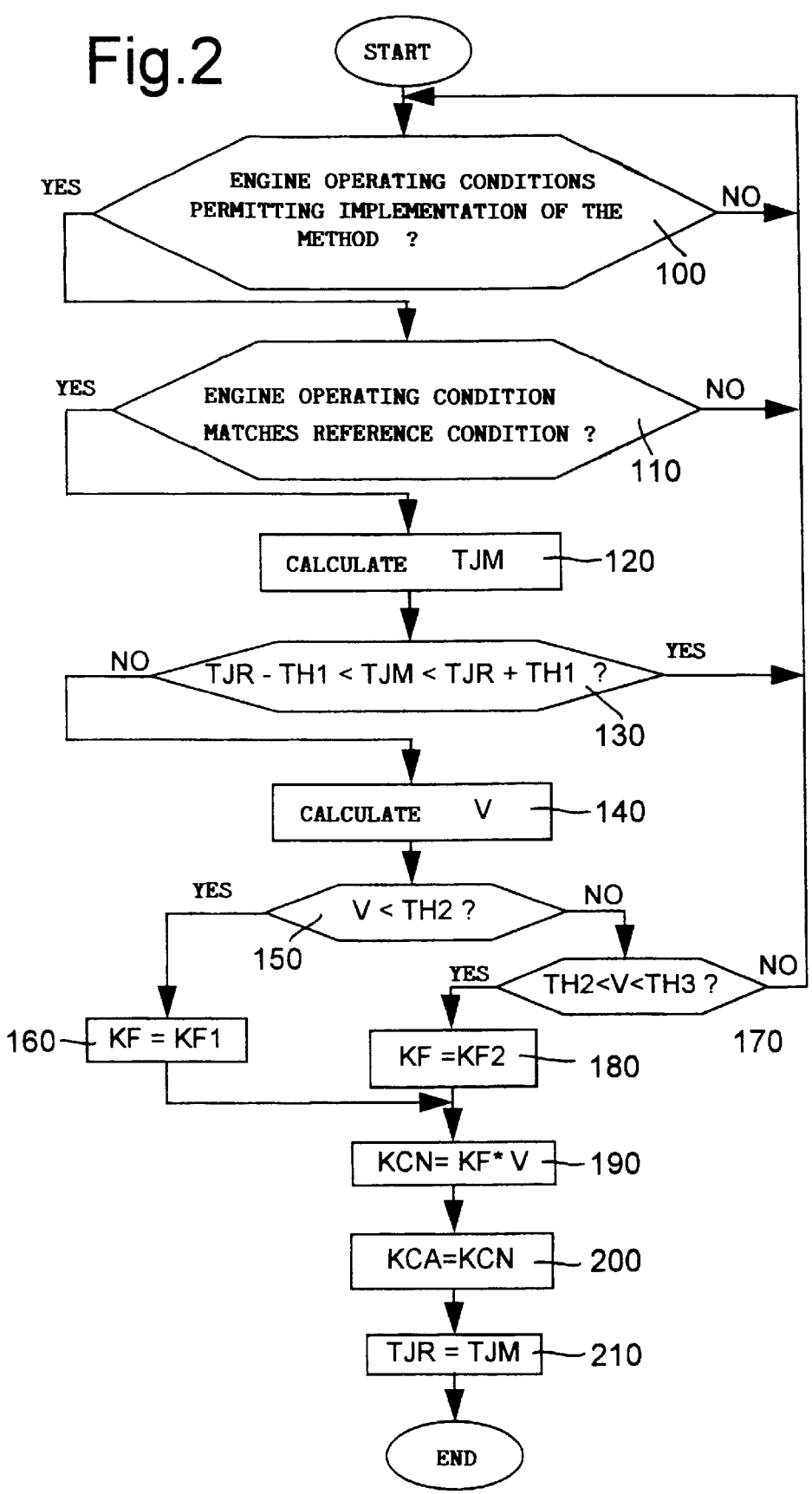

CONTROL METHOD FOR CONTROLLING INJECTION OF AN INTERNAL COMBUSTION ENGINE AS A FUNCTION OF FUEL QUALITY

The present invention relates to a control method for controlling injection of an internal combustion engine as a function of fuel quality.

BACKGROUND OF THE INVENTION

As is known, the quality of a fuel, i.e. its chemical and physical characteristics (composition, stoichiometric air/fuel ratio, density and heat value) as a whole, may vary significantly and at times in ways that are unpredictable by the user, and depends on numerous factors, including: different supply sources, different climatic conditions, season-dependent supply factors, different percentages of inert material, different fuel mixtures, etc.

Consequently, in currently marketed vehicles—in which, as is known, the operating injection time of an injector in each operating state of the engine equals a calibration injection time determined at the initial engine calibration stage using a reference fuel, plus a closed-loop injection time correlated to the composition of the exhaust gases produced by the engine—any alteration in fuel quality may affect the behaviour of the engine in terms of performance and emissions and in direct proportion to the extent to which the fuel used differs from the reference fuel used to calibrate the engine.

SUMMARY OF THE INVENTION

It is an object of the present invention to provide an injection control method capable of automatically determining the quality of the fuel used and adapting injection parameters accordingly.

According to the present invention, there is provided a control method for controlling injection of an internal combustion engine comprising a number of injectors for injecting fuel for a respective operating injection time in each operating state of the engine, and an oxygen concentration sensor generating a composition signal correlated to the oxygen difference in the exhaust gases with respect to a stoichiometric condition; each of said injectors being assigned, in each operating state of the engine, a respective calibration injection time determined at an initial engine calibration stage using a reference fuel; for a given operating state of the engine, said method being characterized by comprising the steps of:

a) determining an intermediate injection time as a function of a number of operating injection times of said injectors;

b) calculating a current correction coefficient as a unction of said intermediate injection time and of a reference injection time determined at said initial engine calibration stage using said reference fuel; and c) for said operating state of the engine, determining a said operating injection time as a function of a respective said calibration injection time; of a closed-loop injection time depending on said composition signal; and of said current correction coefficient.

BRIEF DESCRIPTION OF THE DRAWINGS

A preferred, non-limiting embodiment of the present invention will be described by way of example with reference to the accompanying drawings, in which:

FIG. 2 shows a block diagram of the control method according to the present invention.

DETAILED DESCRIPTION OF THE INVENTION

Figure 1:
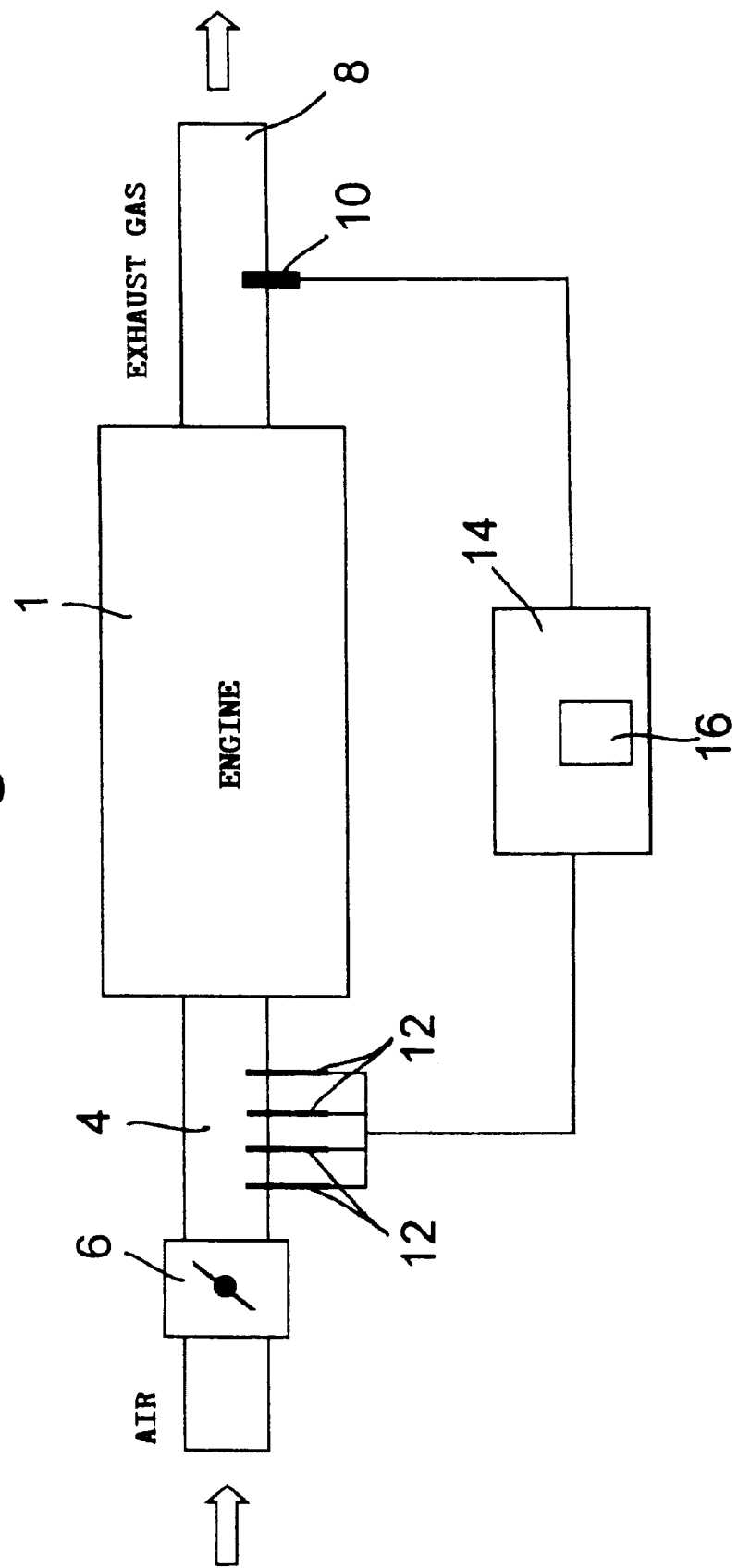
FIG. 1 shows a simplified diagram of an internal combustion engine and connected parts.

Number 1 in FIG. 1 indicates an internal combustion engine of a vehicle (not shown) comprising an air intake conduit 4 for feeding air into the combustion chambers of the cylinders of engine 1 and fitted with a butterfly valve 6 for regulating the amount of air supplied to engine 1; and an exhaust conduit 8 for discharging the exhaust gases produced by engine 1 and fitted with an oxygen concentration (lambda) sensor 10 for generating a composition signal S depending on the oxygen difference in the exhaust gases with respect to the stoichiometric condition (i.e. correlated to the air/fuel ratio of the burnt mixture) and therefore containing information relative to any variation in quality between the fuel actually used and the reference fuel used to calibrate the engine.

A number of injectors 12 are located along, and provide for injecting fuel into, intake conduit 4.

Fuel injection of engine 1 is controlled by a central control unit 14, which receives the composition signal S generated by oxygen concentration sensor 10 and a number of information signals correlated to engine quantities, such as engine speed and load, determined on engine 1, and which generates output signals for driving injectors 12.

Central control unit 14 comprises a memory 16 for storing a value map—hereinafter referred to as a calibration map—containing calibration injection times TJC for each injector 12 in each operating state of engine 1—defined by the speed and load of engine 1—and which are defined at the initial engine 1 calibration stage using a reference fuel, and are used by central control unit 14 to generate drive signals for injectors 12.

Memory 16 also stores an engine 1 reference condition, which is established at the initial engine 1 calibration stage as a condition governing recognition of any variation in fuel quality, and which is defined as follows: engine 1 speed within a predetermined range; engine 1 load within a predetermined range; butterfly valve 6 position within a predetermined range; and feedback injection control, using oxygen concentration sensor 10, activated for at least a predetermined time.

Memory 16 also stores a reference injection time TJR —for the purpose explained later on—which is determined at the initial engine 1 calibration stage and in said reference condition of engine 1 using the reference fuel.

Memory 16 also stores a first and second proportion coefficient KF1, KF2, and a first, second and third threshold value TH1, TH2, TH3, which are determined at the initial engine 1 calibration stage as a function of the speed and load of engine 1, and the purpose of which is explained later on.

According to the present invention, memory 16 also stores an applied correction coefficient KCA, which is updated periodically by central control unit 14 as described in detail later on, and which indicates the injection correction required to take into account the difference between the fuel actually used and the reference fuel used at the engine 1 calibration stage to calculate calibration injection times TJC.

More specifically, according to the present invention, in each operating state of engine 1, central control unit 14 generates the signals for driving each injector 12 in each operating state of engine 1 as a function of an operating injection time TJO, which equals applied correction coefficient KCA multiplied by the sum of the calibration injection time TJC relative to said operating state of engine 1, and a closed-loop injection time TJS relative to said operating state of engine 1 and calculated in known manner by central control unit 14 as a function of the composition signal supplied by oxygen concentration sensor 10. That is:

$$TJO=KCA*(TJC+TJS)$$

In other words, unlike known solutions—in which the central control unit generates each signal for driving the injectors in each operating state of engine 1 as a function of an operating injection time TJO which only equals the sum of calibration injection time TJC and closed-loop injection time TJS—central control unit 14 performs the operations described below with reference to FIG. 2 to determine the quality of the fuel actually used and to update the applied correction coefficient KCA used to adapt injection to any variations in the quality of the fuel used.

As shown in FIG. 2, in a first block 100, central control unit 14 determines the presence of engine 1 operating conditions permitting reliable interpretation of the information from oxygen concentration sensor 10 and, hence, implementation of the method according to the present invention.

More specifically, the information from oxygen concentration sensor 10 is deemed reliable when engine 1 is in the steady operating state; engine 1 is thermally stable; the voltage of the vehicle battery (not shown) is correct; and there are no faults on engine 1, oxygen concentration sensor 10, injectors 12 or central control unit 14. Such conditions may be determined, for example, by reading the logic states of corresponding logic flags stored in memory 16.

If the information from oxygen concentration sensor 10 is reliable (YES output of block 100), block 100 goes on to a block 110; conversely, if the information from oxygen concentration sensor 10 is not reliable (NO output of block 100), block 100 goes back to its own input to repeat the check until the information from oxygen concentration sensor 10 is deemed reliable.

In block 110, central control unit 14 determines whether the operating condition of engine 1—defined by the speed and load of engine 1, by the position of butterfly valve 6, and by feedback injection control using oxygen concentration sensor 10—matches the reference condition defined above.

If the operating condition of engine 1 matches the reference condition (YES output of block 110), block 110 goes on to a block 120; conversely, if the operating condition is other than the reference condition (NO output of block 110), block 110 goes back to block 100 to repeat the checks until the operating condition of engine 1 matches the reference condition.

Block 120 calculates an intermediate injection time TJM equal to the mean value of an N number of operating injection times TJO of injectors 12 in the current operating state of engine 1, and wherein N is the numeric value memorized in memory 16 at the engine 1 calibration stage.

Block 120 then goes on to a block 130, in which central control unit 14 determines whether intermediate injection time TJM is within a predetermined range comprising reference injection time TJR, i.e. determines whether:

$$TJR-TH1<TJM<TJR+TH1$$

where TH1 is the first threshold value memorized in memory 16.

If intermediate injection time TJM is within said range (YES output of block 130), this means the normal operating fuel of engine 1 is substantially identical with the reference fuel used to calibrate the engine (thus requiring no injection correction), and block 130 goes back to block 100.

In which case, central control unit 14 continues calculating operating injection times TJO of injectors 12 using the applied correction coefficient KCA stored in memory 16.

Conversely, if intermediate injection time TJM is outside said range (NO output of block 130), this means the fuel actually used differs from the reference fuel used to calibrate the engine (thus requiring a fuel injection correction), and block 130 goes on to a block 140.

In block 140, central control unit 14 determines, as an absolute value, the variation V in intermediate injection time TJM with respect to reference injection time TJR according to the equation:

$$|V|=|(TJM-TJR)/TJR|$$

Block 140 then goes on to a block 150 in which central control unit 14 determines whether variation V is below the second threshold value TH2 memorized in memory 16.

If variation V is below second threshold value TH2 (YES output of block 150), block 150 goes on to a block 160; conversely, if variation V is above second threshold value TH2 (NO output of block 150), block 150 goes on to a block 170.

In block 160, central control unit 14 reads the value of first proportion coefficient KF1 in memory 16, and calculates the value of an operating proportion coefficient KF by making it equal to the value of first proportion coefficient KF1, i.e. KF=KF1.

Block 160 then goes on to a block 190 described later on.

In block 170, central control unit 14 determines whether variation V is between second threshold value TH2 and the third threshold value TH3 memorized in memory 16 and greater than second threshold value TH2.

If variation V is between the second and third threshold values TH2, TH3 (YES output of block 170), block 170 goes on to a block 180; conversely, if variation V is above third threshold value TH3 (NO output of block 170), this means the calculated intermediate injection time TJM is unreliable by differing excessively from respective reference injection time TJR, so that block 170 goes back to block 100.

In block 180, central control unit 14 reads the value of second proportion coefficient KF2 in memory 16, and calculates the value of an operating proportion coefficient KF by making it equal to the value of second proportion coefficient KF2, i.e. KF=KF2.

Block 180 then goes on to block 190 in which central control unit 14 determines a current correction coefficient KCN according to the equation:

$$KCN=KF*V=KF*(TJM-TJR)/TJR$$

Block 190 then goes on to a block 200 in which central control unit 14 updates applied correction coefficient KCA as a function of current correction coefficient KCN. More specifically, central control unit 14 makes the applied correction coefficient KCA stored in memory 16 equal to current correction coefficient KCN, i.e. KCA=KCN.

The calculated current correction coefficient KCN therefore becomes the applied correction coefficient KCA used to calculate operating injection times TJO in subsequent engine cycles.

Block 200 then goes on to a block 210 in which central control unit 14 modifies reference injection time TJR as a function of the value of intermediate injection time TJM.

More specifically, in block 210, central control unit 14 makes the value of the reference injection time TJR stored in memory 16 equal to the value of intermediate injection time TJM, i.e. TJR=TJM, so that intermediate injection time TJM is used as reference injection time TJR in subsequent repetitions of the operations described.

The updated applied correction coefficient KCA is then used by central control unit 14 to calculate subsequent operating injection times TJO as described above.

Depending on the maker's choice, the operations described above with reference to blocks 100–210 may either be performed cyclically whenever the conditions described with reference to blocks 100 and 110 are determined, or only once, each time engine 1 is turned on.

The advantages of the control method according to the present invention will be clear from the foregoing description.

In particular, the control method according to the present invention provides for fully automatically recognizing the quality of any type of gaseous or liquid fuel, and for adapting injection as a function of a variation in fuel quality.

The control method according to the present invention also provides for minimizing any loss in performance of the engine, and for maintaining emissions within legal limits.

Clearly, changes may be made to the control method as described and illustrated herein without, however, departing from the scope of the present invention.

For example, block 100—in which central control unit 14 determines the presence of engine 1 operating conditions permitting reliable interpretation of the information from oxygen concentration sensor 10—need not determine a steady operating state of engine 1. In which case, in calculating intermediate injection time TJM, central control unit 14, as opposed to N number of any operating injection times TJO, will only take into account N operating injection times TJO relative to the same operating state of engine 1, or to operating states of engine 1 differing in a way which has no effect on the calculation of intermediate injection time TJM.

Moreover, intermediate injection time TJM and reference injection time TJR may be determined in different engine operating conditions. In which case, however, the comparison made in block 130 would differ from that described, and would have to take into account the relationship between the operating condition in which intermediate injection time TJM is determined, and that in which reference injection time TJR is determined.

Finally, intermediate injection time TJM may be calculated as a function of the N operating injection times TJO in a way other than that described.

What is claimed is:

1. A control method for controlling injection of an internal combustion engine (1) comprising a number of injectors (12) for injecting fuel for a respective operating injection time (TJO) in each operating state of the engine (1), and an oxygen concentration sensor (10) generating a composition signal (S) correlated to the oxygen difference in the exhaust gases with respect to a stoichiometric condition; each of said injectors (12) being assigned, in each operating state of the engine (1), a respective calibration injection time (TJC) determined at an initial engine calibration stage using a reference fuel; for a given operating state of the engine (1), said method being characterized by comprising the steps of:
   a) determining an intermediate injection time (TJM) as a function of a number (N) of operating injection times (TJO) of said injectors (12);
   b) calculating a current correction coefficient (KCN) as a function of said intermediate injection time (TJM) and of a reference injection time (TJR) determined at said initial engine calibration stage using said reference fuel; and
   c) for said operating state of the engine (1), determining a said operating injection time (TJO) as a function of a respective said calibration injection time (TJC); of a closed-loop injection time (TJS) depending on said composition signal (S); and of said current correction coefficient (KCN).

2. A control method as claimed in claim 1, characterized in that said step a) comprises the step of:
   a1) determining said intermediate injection time (TJM) as a function of the mean value of said operating injection times (TJO).

3. A control method as claimed in claim 1, characterized in that said operating injection times (TJO) used for determining said intermediate injection time (TJM) are effected in said operating state of the engine (1).

4. A control method as claimed in claim 1, characterized in that said step b) comprises the steps of:
   b1) determining, as an absolute value, the variation (V) in said intermediate injection time (TJM) with respect to said reference injection time (TJR); and
   b2) determining said current correction coefficient (KCN) as a function of said variation (V).

5. A control method as claimed in claim 4, characterized in that said step b2) comprises the steps of:
   b21) comparing said variation (V) with a first threshold value (TH2);
   b22) determining an operating proportion coefficient (KF) as a function of a memorized first proportion coefficient (KF1) in the event said variation (V) has a first predetermined relationship with said first threshold value (TH2);
   b23) comparing said variation (V) with a second threshold value (TH3) in the event said variation (V) does not have said first predetermined relationship with said first threshold value (TH2);
   b24) determining said operating proportion coefficient (KF) as a function of a memorized second proportion coefficient (KF2) in the event said variation (V) has a second predetermined relationship with said second threshold value (TH3); and
   b25) determining said current correction coefficient (KCN) as a function of said variation (V) and of said operating proportion coefficient (KF).

6. A control method as claimed in claim 5, characterized in that said step b25) comprises the step of determining said current correction coefficient (KCN) according to the equation KCN=KF*V, where KCN is said current correction coefficient, KF is said operating proportion coefficient, and V is said variation.

7. A control method as claimed in claim 5, characterized in that said first predetermined relationship is defined by the condition that said variation (V) be below said first threshold value (TH2).

8. A control method as claimed in claim 5, characterized in that said second predetermined relationship is defined by the condition that said variation (V) be between said first and second threshold values (TH2, TH3).

9. A control method as claimed in claim 1, characterized by also comprising the steps of:
   d) comparing said intermediate injection time (TJM) with said reference injection time (TJR); and
   e) performing said steps b) and c) in the event said intermediate injection time (TJM) has a third predetermined relationship with said reference injection time (TJR).

10. A control method as claimed in claim 9, characterized by also comprising the step of:

f) determining said operating injection time (TJO) as a function of said calibration injection time (TJC) relative to said operating state of the engine (1), of said closed-loop injection time (TJS), and of a memorized applied correction coefficient (KCA), in the event said intermediate injection time (TJM) does not have said third predetermined relationship with said reference injection time (TJR).

11. A control method as claimed in claim 10, characterized by comprising the step of:

g) after said step e), modifying said applied correction coefficient (KCA) as a function of said current correction coefficient (KCN).

12. A control method as claimed in claim 11, characterized in that said step g) comprises the step of:

g1) after said step e), making said applied correction coefficient (KCA) equal to said current correction coefficient (KCN).

13. A control method as claimed in claim 12, characterized in that said step c) comprises the step of:

c1) determining said operating injection time (TJO) according to the equation:

$$TJO=KCA*(TJC+TJS)$$

where TJO is a said operating injection time, TJC is said calibration injection time, TJS is said stoichiometric injection time, and KCA is said applied correction coefficient.

14. A control method as claimed in claim 9, characterized in that said third predetermined relationship is defined by the condition that said intermediate injection time (TJM) be within a predetermined range comprising said reference injection time (TJR).

15. A control method as claimed in claim 1, characterized by also comprising the step of:

h) modifying said reference injection time (TJR) relative to said operating state of the engine (1) as a function of said intermediate injection time (TJM).

16. A control method as claimed in claim 15, characterized in that said step h) comprises the step of:

h1) making said reference injection time (TJR) equal to said intermediate injection time (TJM).

17. A control method as claimed in claim 1, characterized in that said reference injection time (TJR) is determined at said initial engine calibration stage in a reference condition of said engine (1); and in that said steps a), b) and c) are performed in a predetermined operating condition of said engine (1) having a fourth predetermined relationship with said reference condition.

18. A control method as claimed in claim 17, characterized in that said reference condition is defined at said initial engine calibration stage, and comprises at least one of the following conditions: speed of the engine (1) within a predetermined range; load of the engine (1) within a predetermined range; position of a butterfly valve (6), in an air intake conduit (4) of said engine (1), within a predetermined range; and feedback injection control, using an oxygen concentration sensor (10) fitted to an exhaust conduit (8) for discharging the exhaust gases produced by said engine (1), activated for at least a predetermined time.

19. A control method as claimed in claim 17, characterized in that said fourth predetermined relationship is defined by the condition that said operating condition substantially matches said reference condition.

20. A control method as claimed in claim 1, characterized by also comprising the step of:

l) performing said steps a), b) and c) in the presence of predetermined operating conditions of said engine (1).

21. A control method as claimed in claim 20, characterized in that said predetermined operating conditions comprise a steady state operating condition of the engine (1).

22. A control method as claimed in claim 20, characterized in that said predetermined operating conditions comprise a thermally stable condition of the engine (1).

23. A control method as claimed in claim 20, characterized in that said predetermined operating conditions comprise the absence of faults on said engine (1), said injectors (12), and said oxygen concentration sensor (10).

24. A control method as claimed in claim 20, characterized in that said predetermined operating conditions comprise a correct battery voltage.

* * * * *

UNITED STATES PATENT AND TRADEMARK OFFICE
CERTIFICATE OF CORRECTION

PATENT NO. : 6,279,559 B1
DATED : August 28, 2001
INVENTOR(S) : Marco Mauro et al.

It is certified that error appears in the above-identified patent and that said Letters Patent is hereby corrected as shown below:

<u>Title page,</u>
Please correct the spelling of the Assignee to read -- C.R.F. Società Consortile per Azioni --

Signed and Sealed this

Twenty-sixth Day of March, 2002

*Attest:*

*Attesting Officer*

JAMES E. ROGAN
*Director of the United States Patent and Trademark Office*